United States Patent [19]

Nakayama

[11] Patent Number: 5,006,691

[45] Date of Patent: Apr. 9, 1991

[54] WIRE CUT ELECTRIC DISCHARGE MACHINE

[75] Inventor: Yoshiro Nakayama, Aichi, Japan

[73] Assignee: Mitsubishi Denki K.K., Tokyo, Japan

[21] Appl. No.: 509,834

[22] Filed: Apr. 17, 1990

[30] Foreign Application Priority Data

Apr. 19, 1989 [JP] Japan .................................. 1-99145

[51] Int. Cl.$^5$ .............................................. B23H 7/06
[52] U.S. Cl. .............................. 219/69.12; 219/69.17; 364/474.04
[58] Field of Search .......................... 219/69.12, 69.17; 364/474.04, 474.28

[56] References Cited

U.S. PATENT DOCUMENTS

| | | | |
|---|---|---|---|
| 4,559,601 | 12/1985 | Kishi et al. ........................ | 219/69.12 |
| 4,703,146 | 10/1987 | Kinoshita ......................... | 219/69.17 |
| 4,713,517 | 12/1987 | Kinoshita ......................... | 219/69.12 |

FOREIGN PATENT DOCUMENTS

| | | | |
|---|---|---|---|
| 62-297023 | 12/1987 | Japan . | |
| 63-39732 | 2/1988 | Japan .................................. | 219/69.12 |
| 85-01001 | 3/1985 | PCT Int'l Appl. .............. | 219/69.17 |

Primary Examiner—Geoffrey S. Evans
Attorney, Agent, or Firm—Sughrue, Mion, Zinn, Macpeak & Seas

[57] ABSTRACT

A wire cut electric discharge machine which is capable of taper-machining with high accuracy. A correction factor which is to correct errors attributing to a special purpose jig is obtained according to a difference between an aimed angle and an actual taper angle of a test workpiece which has been machined with the aimed angle. An automatic correction operation is carried out by using the correction factor to correct the distances of the upper and lower wire guides from a reference table, which have been calculated as necessary for controlling the movement of the wire guides.

4 Claims, 6 Drawing Sheets

WIRE CUT ELECTRIC DISCHARGE MACHINE

BACKGROUND OF THE INVENTION

This invention relates to wire cut electric discharge machines. More particularly, the invention concerns a wire cut electric discharge machine in which a tapering operation is carried out by moving the wire guide horizontally which tensions the wire electrode.

FIG. 1 is a schematic diagram outlining a tapering operation accomplished by an ordinary wire cut electric discharge machine. In FIG. 1, reference numeral 1 designates a wire electrode; 2, an upper wire guide; 3, a lower wire guide; 4, a workpiece to be taper-machined; and 5, a reference table on which the workpiece 4 is placed.

In the case where, with the wire electrode 1 inclined at a specified angle, a tapering machining is carried out by the wire cut electric discharge machine thus constructed, the upper wire guide 2 is spaced as much as a distance e from a vertical line 6 which passes through the lower wire guide 3 and is normal to a top surface of the reference table 5, so that a wire electrode 1 forms a taper angle $\theta$ with the vertical line 6.

On the other hand, in the case where the workpiece 4 having a thickness t is tapered at an angle $\theta$, it is necessary to space the upper wire guide 2 a distance X from the reference table 5, and to space the lower wire guide 3 a distance Y from the reference table 5.

A method of calculating the distances X and Y to obtain the taper angle $\theta$ will be described with reference to FIG. 2 and FIGS. 3(a) and 3(b).

FIG. 2 is a schematic diagram showing a side view of a jig for calculating the distances X and Y. In FIG. 2, reference numeral 7 designates a jig; 8, an upper detecting part; 9, a lower detecting part and character a denote the height of the lower detecting part 9 from the reference table; and b, the height of the upper detecting part 8 from the same.

FIGS. 3(a) and 3(b) are explanatory diagrams for calculation of the distances X and Y.

In FIGS. 3(a) and 3(b), reference character 2a designates the position of the upper wire guide 2 set when the wire electrode 1 is brought into contact with the upper and lower detecting parts 8 and 9 of the jig 7; 3a, the position of the lower wire guide 3 set when the wire electrode 1 is brought into contact with the upper and lower detecting parts 8 and 9 of the jig 7; 2b and 3b, the positions of the upper and lower wire guides 2 and 3 set when the wire electrode 1 is turned clockwise by a taper angle $\theta_a$ and the wire electrode is maintained contacting with the lower detecting part 9; e, the distance for which the upper wire guide 2 has been moved to turn the wire electrode by the taper angle $\theta_a$; c, the distance between the positions 3a and 3b of the lower wire guide 3; 2c and 3c, the positions of the upper and lower wire guides 2 and 3 set when the wire electrode 1 is inclined counterclockwise at the taper angle $\theta_a$ and the wire electrode 1 is kept contacting with the upper detecting part 8; and e, the distance for which the upper wire guide has been moved to incline the wire electrode 1 as described above; d, the distance between the positions 3a and 3c of the lower wire guide 3; and z, the reference height of the upper wire guide 2 in the Z-axis direction.

Now, a procedure of automatically calculating the distances X and Y of the upper and lower wire guides 2 and 3 from the reference table 5 will be described with reference to FIG. 4 showing a flow chart therefor.

After parameters necessary for calculation such as the taper angle $\theta_a$ and a tolerance for the taper angle have been inputted, a program as shown in FIG. 4 is executed. First, in Step S1, as shown in FIGS. 3(a) and 3(b), the wire electrode 1 is held vertical and brought into contact with the upper and lower detecting parts 8 and 9; that is, the wire electrode 1 is positioned in place. More specifically, the positions of the upper and lower wire guides 2 and 3 are as indicated at 2a and 3a. Thereafter, in Step S2, the coordinates of the positions of the upper and lower detecting parts 8 and 9 are stored in a memory (not shown).

In Step S3, as shown in FIG. 3(b), the upper wire guide 2 is moved by the distance e horizontally so that the wire electrode 1 is inclined clockwise at the specified angle $\theta$a; and in Step S4 the wire electrode 1 is brought into contact with the lower detecting part 9. As a result, the positions of the upper and lower wire guides 2 and 3 are as indicated at 2b and 3b, respectively. In Step S5, the distance c between the positions 3a and 3b of the lower wire guide is stored in the memory.

In Step S6, as shown in FIG. 3(b), the upper and lower wire guides (2a and 3a) holding the wire electrode is vertical is moved horizontally, so that the wire electrode 1 is inclined counterclockwise at the specified angle $\theta_a$, 6° for instance. In Step S7, the wire electrode 1 is brought into contact with the upper detecting part 8. As a result, the positions of the upper and lower wire guides are as indicated at 2c and 3c. In Step S8, the distance d between the positions 3a and 3c of the lower wire guide is stored in the memory. In Step S9, the data stored in the memory, and the input parameters are utilized to calculate the data required for control of the movement of the wire guides; that is, the distance $X_b$ between the reference table 5 and the upper wire guide 2, the distance $Y_b$ between the surface table 5 and the lower wire guide, and the taper angle $\theta_b$ as follows:

$$Y_b = (b \cdot c - a \cdot b)/(d - c) \tag{1}$$

$$X_b = \{e(a + Y_b)\}/c \tag{2}$$

$$\theta_b = \tan^{-1}(e/(X_b + Y_b)) \tag{3}$$

In Step S10, it is determined whether or not the difference between the data $\theta_b$ obtained from equation (3) and the specified angle $\theta_a$ is within a predetermined tolerance $\theta_c$. If it is within the tolerance, then Step S11 is effected; that is, the data $X_b$, $Y_b$ nd $\theta_b$ thus calculated are stored in the memory, and the data $X_b$ and $Y_b$ are used to move the wire guide. If $(\theta_b - \theta_a)$ is more than the tolerance $\theta_c$, then Step S3 is effected again, and the following Steps are carried out.

In the above-described conventional wire cut electric discharge machine, an error in manufacturing the jig 7 adversely affects the distance X between the reference table and the upper wire guide and the distance Y between the reference table and the lower wire guide, as a result of which accuracy in the taper-machining is degraded. Further, discharge reaction force generated during machining, resistance in the flow of a machining solution and the like may result in an occurrence of deformation of a wire electrode during the machining. The deformation and the difference in thickness of a workpiece cause an error to occur during an actual machining operation.

Accordingly, an object of the present invention is to eliminate the above-described difficulty accompanying a conventional wire cut electric discharge machine. More specifically, an object of the invention is to provide a wire cut electric discharge machine which can perform a tapermachining with high accuracy even if the jig has a manufacture error and there occurs an error in an actual machining.

A wire cut electric discharge machine according to the invention comprises: automatic calculating means for calculating with a special purpose jig the distances of the upper and lower wire guides from a surface table which are necessary for moving the wire guides to incline the wire electrode through a predetermined angle; correction factor calculating means for calculating a correction factor for the distances of the upper and lower wire guides from the surface table according to a difference angle between the predetermined and the taper angle of a workpiece which has been machined for test with the predetermined angle; and automatic correcting means for correcting the distances of the upper and lower wire guides from the surface table by multiplying the distances by the correction factor thus calculated.

In the wire cut electric discharge machine of the invention, the correction factor calculating means calculates the correction factor which is to correct the error attributing to the special purpose jig, according to the difference between the predetermined angle and the taper angle of a test workpiece which has been machined with the predetermined angle, and the automatic correcting means uses the correction factor to correct the distances of the upper and lower wire guides from the surface table, which have been calculated as necessary for controlling the movement of the wire guides.

That is, the wire cut electric discharge machine of the invention is markedly improved in tapering accuracy.

BRIEF DESCRIPTION OF THE DRAWINGS

In the accompanying drawings:

FIG. 7 is an explanatory diagram showing an example of a display on an input/display unit in the wire cut electric discharge machine;

DESCRIPTION OF THE PREFERRED EMBODIMENTS

One preferred embodiment of the invention will be described with reference to the accompanying drawings.

Figure 5:
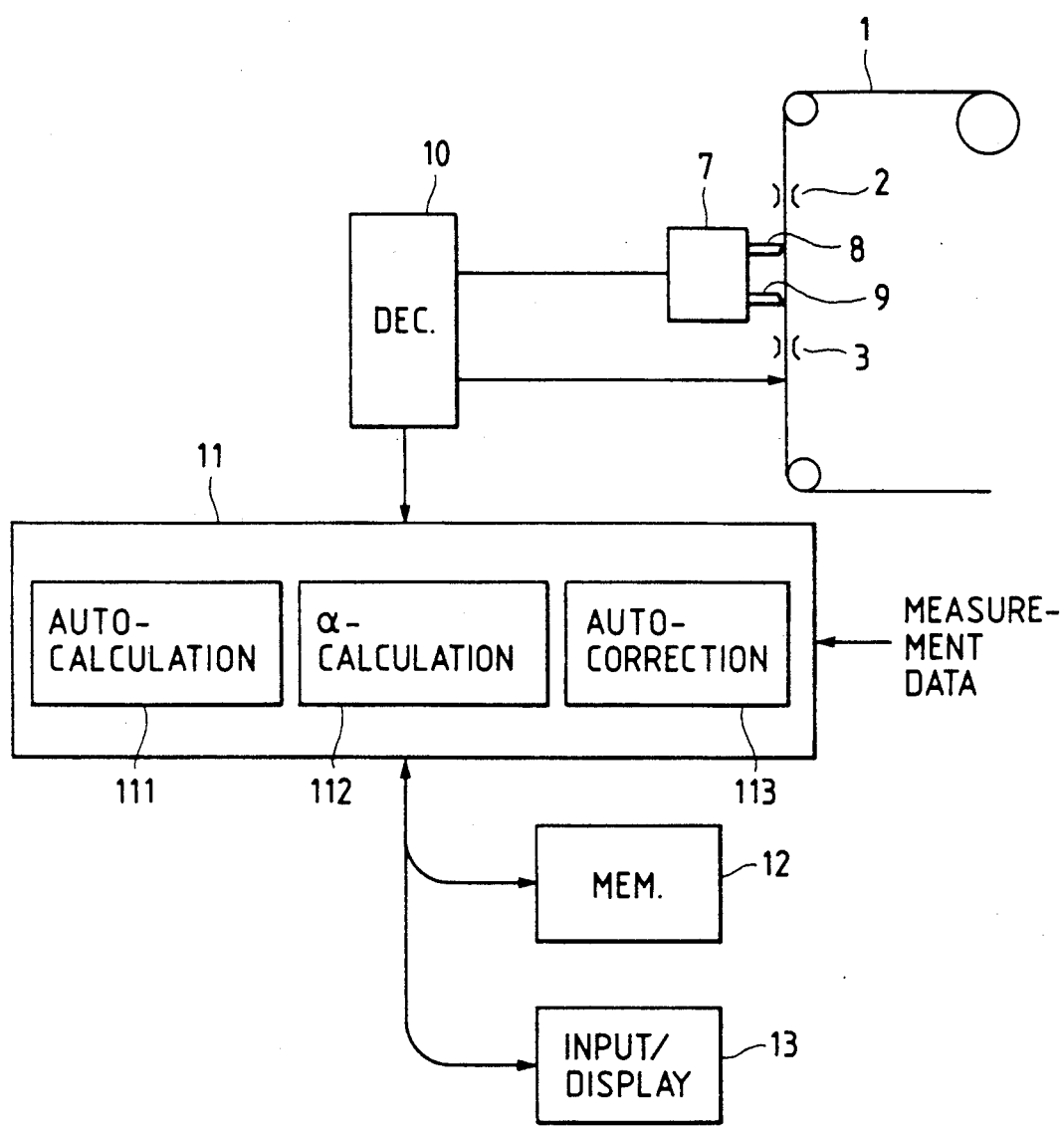
FIG. 5 is an explanatory diagram, partly as a block diagram, showing an example of a wire cut electric discharge machining according to the present invention.

FIG. 5 is a diagram showing the entire arrangement of an example of a wire cut electric discharge machine according to the present invention.

Figure 1:
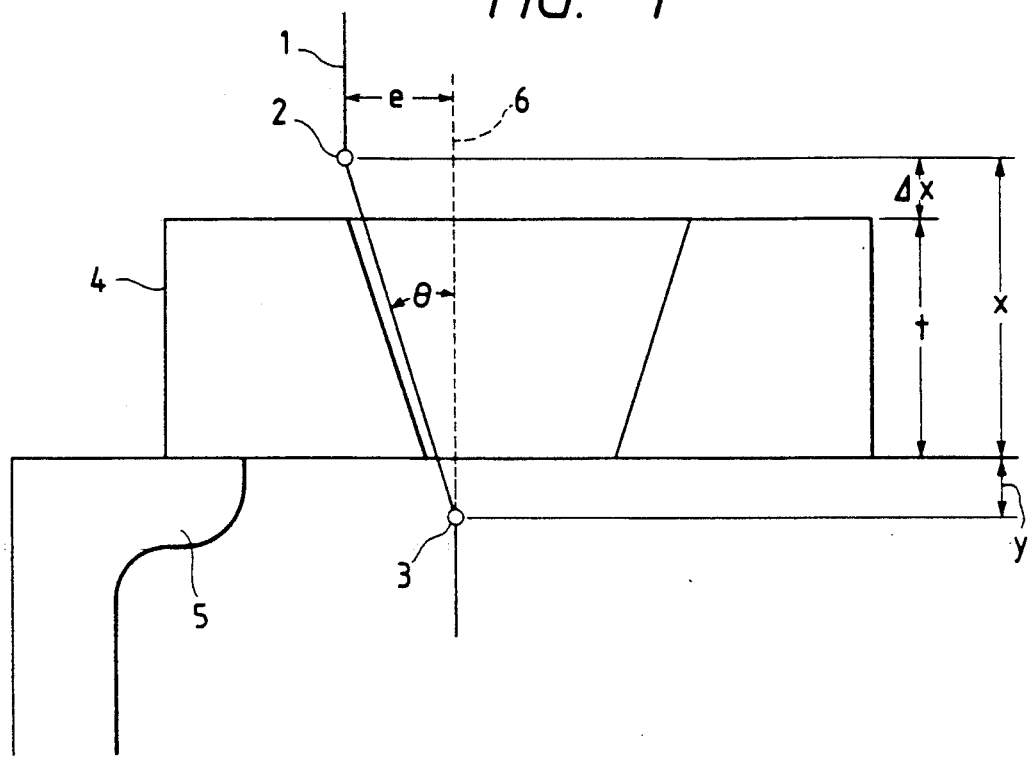
FIG. 1 is an diagram for a description of an operation of tapering a workpiece with a wire electrode.
Figure 2:
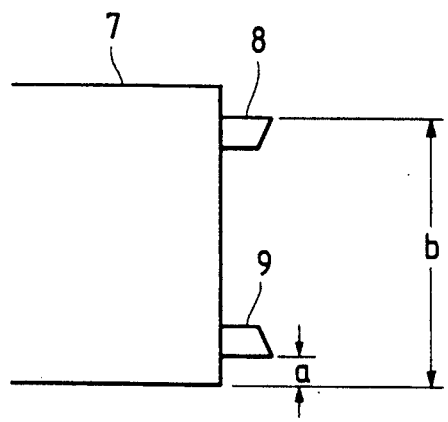
FIG. 2 is a schematic diagram showing a side view of a conventional special purpose jig.
Figure 3A:
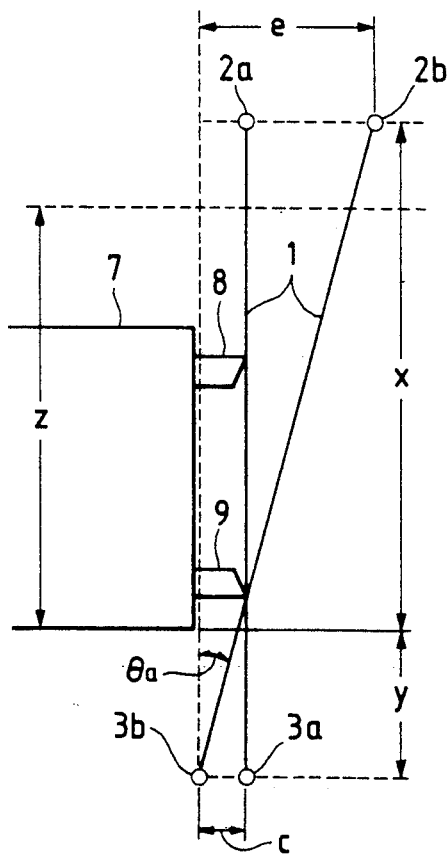
FIGS. 3(a) and 3(b) are explanatory diagrams for a description of a method of measuring distances with the conventional special purpose jig.
Figure 3B:
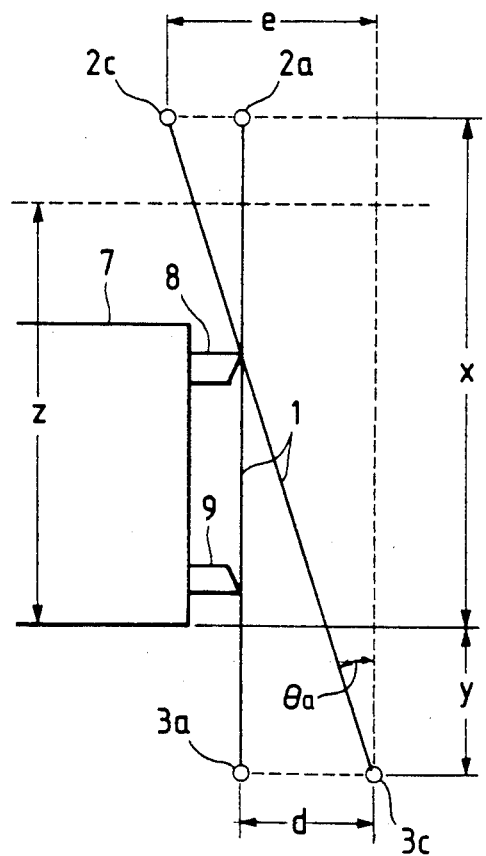
Figure 4:
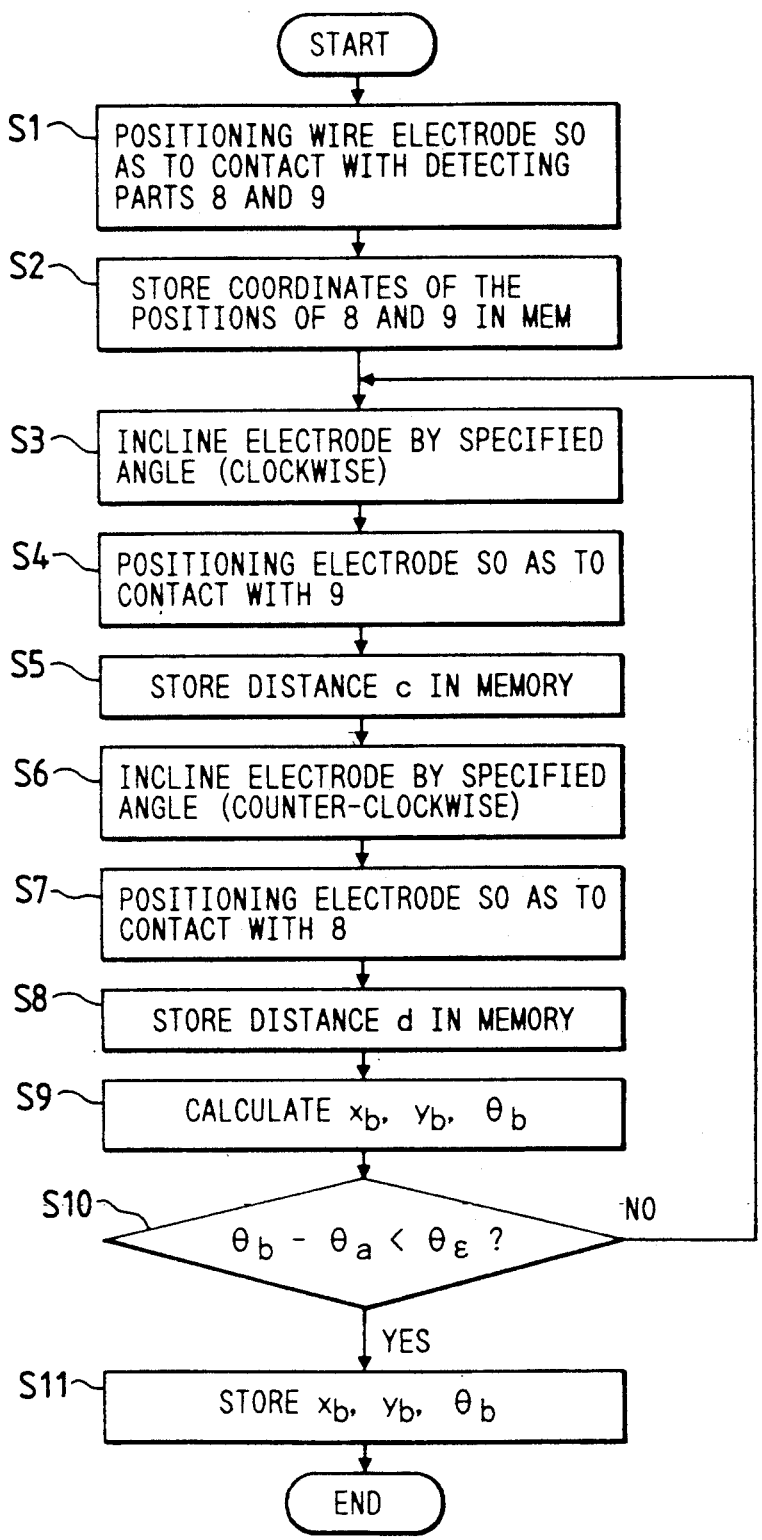
FIG. 4 is a flow chart showing a conventional distance measuring process.

In FIG. 5, those components which have been already described with reference to FIGS. 1 and 2 are therefore designated by the same reference numerals or characters. That is, in FIG. 5, reference numeral 1 designates a wire electrode; 2 and 3, upper and lower wire guides for holding the wire electrode 1 under tension, the upper and lower wire guides being movable three-dimensionally (in the X-axis, Y-axis and Z-axis directions) by guide drive means (not shown); and 7, a special purpose jig for detecting the tension of the wire electrode 1 and the angle of the latter, the jig 7 having upper and lower detecting parts 8 and 9 which are brought into the wire electrode 1.

Further in FIG. 5, reference numeral 10 designates a detector circuit for detecting when the wire electrode 1 is brought into contact with the upper and lower detecting parts 8 and 9 of the jig 7, the detector circuit 10 being connected to the jig 7 and the wire electrode 1; and 11, a processor comprising a microcomputer. More specifically, the processor 11 comprises: an automatic calculating means 111 for calculating the distances $X_b$ and $Y_b$ shown in FIG. 8 of the upper and lower wire guides 2 and 3 from the reference table 5 (FIG. 1); a correction factor calculating means 112 for calculating a correction factor $\alpha$ from input data such as the distances $X_b$ and $Y_b$ calculated by the automatic calculating means 111, the measured taper angle $\theta_d$ of a workpiece which is machined at a specified angle $\theta_a$ for test, a reference height z from the top surface of the reference table in the Z-axis direction in a trial machining operation, and an angle difference $\theta_c(\theta_d-\theta_a)$; and an automatic correcting means 113 for correcting the distances $X_b$ and $Y_b$ by using the correction factor $\alpha$ to thereby obtain corrected distances $X_c$ and $Y_c$.

The processor 11 is connected to a memory 12 for storing the distances $X_c$ and $Y_c$ calculated by using the jig 7, the correction factor $\alpha$, and the corrected distances $X_c$ and $Y_c$, and it is further connected to an input/display unit 13 which receives parameters necessary for operation, and displays the parameters and the results of operations done by the processor 11.

Prior to the operation of the embodiment, the angle error caused when the distances between the reference table 5 and the upper and lower wire guides 2 and 3 are erroneous will be described with reference to FIGS. 8(a) and 8(b).

Figure 8A:
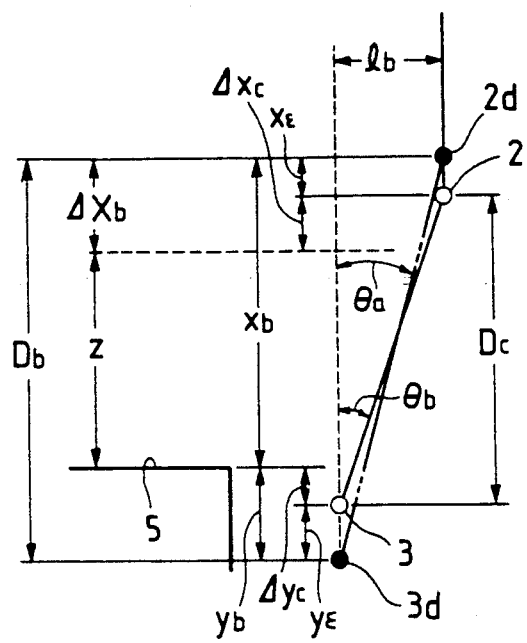
FIGS. 8(a) and 8(b) are explanatory diagram for a description of the relationships between distance errors and angle errors in the electric discharge machine of the invention.

In FIG. 8a, reference characters 2d and 3d designate the calculated positions of the upper and lower wire guides 2 and 3 which correspond to the distances $X_b$ and $Y_b$ from the reference table 5 which are calculated by the automatic calculating means 111 in the processor 11 by using the special purpose jig 7. Further in FIG. 8(a), reference characters $X_c$ and $Y_c$ designate the difference between the distance of the actual position of the upper wire guide 2 from the reference table 5 corresponding to an actual taper-angle $\theta_d$ described later and the distance of the calculated position thereof from the reference table 5, and the difference between the distance of the actual position of the lower wire guide 3 from the reference table 5 corresponding to the actual taper-angle and the distance of the calculated position thereof from the surface table 5, respectively; $\theta_a$, a taper angle set; $l_b$, the amount of movement of the upper wire guide when the distances of the upper and lower wire guides 2 and 3 from the surface table 5 are $X_b$ and $Y_b$; $\theta_d$, an actual taper angle which is formed by the upper and lower wire guides 2 and 3 which are actually moved so that the amount of movement of the upper guide 2 from a reference position on a dotted line in the figure is $l_b$, in other words, the actual taper-angle being actually formed on the workpiece during machining; and z, a Z-axis reference level.

Figure 8B:
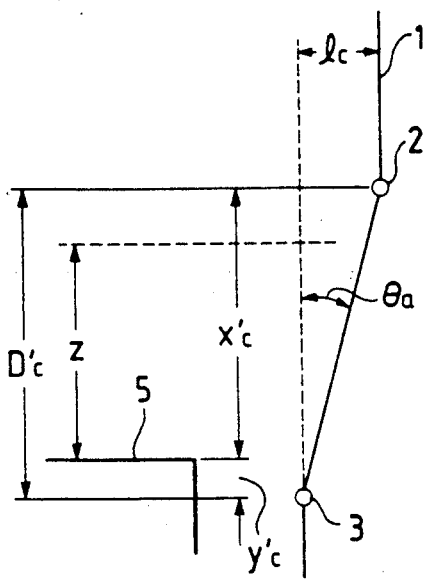

FIG. 8(b), reference characters $X_c'$ and $Y_c'$ designate the distances of the upper and lower wire guides 2 and 3 from the reference table 5 which have been corrected with the correction factor $\alpha$; $l_c$, the amount of movement of the upper wire guide 2 when the distances of the upper and lower wire guides 2 and 3 from the surface table 5 are $X_c'$ and $Y_c$, respectively; and $\theta e$, a taper angle when the amount of movement of the upper wire guide 2 from the reference position is $l_c$.

As is apparent from FIG. 8(a), the distances $X_b$ and $Y_b$ of the upper and lower wire guides 2 and 3 from the surface table 5, which are calculated by using the jig 7, include errors $X_e$ and $Y_e$, respectively. The errors attributes to the errors of dimensions a and b of the jig 7 (cf. FIG. 2).

Now, the effects of the errors $X_e$, and $X_e$, on the taper angle $\alpha$ will be described.

The amount of movement $l_b$ of the wire guide is as follows:

$$l_b = (X_b + Y_b) \tan \theta_a \qquad (4)$$
$$= (X_c + Y_c + X_\epsilon + Y_\epsilon) \tan \theta_a$$

That is, the $l_b$ has an error of $l_e = (X_e + Y_c) \tan \theta_a$.
The taper angle $\theta_e$ is as follows:

$$\begin{aligned}\theta_\epsilon &= \theta_d - \theta_a \qquad (5)\\ &= \tan^{-1}(l_b/(X_c + Y_c)) - \tan^{-1}(l_c/(X_c + Y_c))\\ &= \tan^{-1}((l_c + l_\epsilon)/(X_c + Y_c)) - \tan^{-1}(l_c/(X_c + Y_c))\end{aligned}$$

Thus, $l_e$ directly causes error for the taper angle. The data $l_e$ is a function of $\tan \theta$, and the taper angle error $\theta\epsilon$ increases with the increasing sum of errors $(X_e + Y_e)$ in the distances of the upper and lower wire guides from the reference table.

Figure 6:
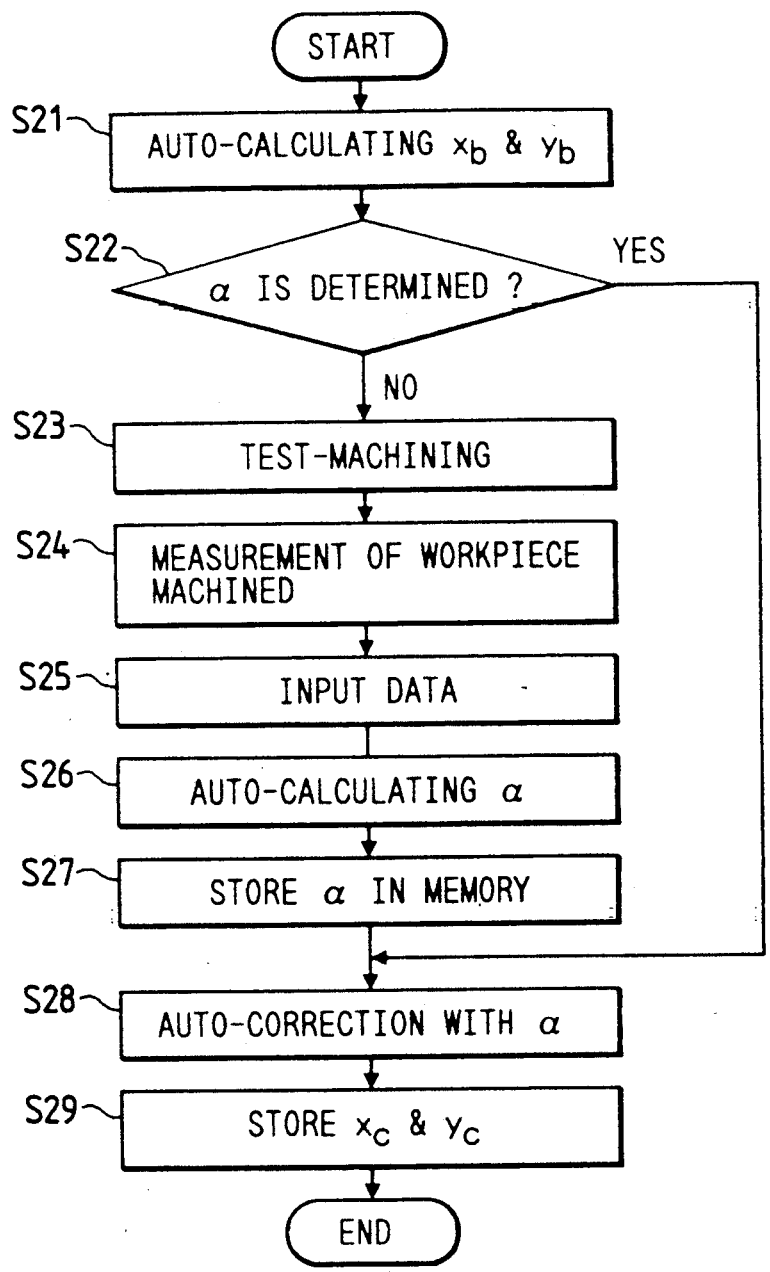
FIG. 6 is a flow chart for a description of the operation of the wire cut electric discharge machine.

Now, a method will be described with reference to FIG. 6 showing a flow chart, in which the correction factor $\alpha$ obtained through the machining of a test workpiece is used to automatically correct the distances of the upper and lower wire guides 2 and 3 from the surface table 5 which have been calculated by using the special purpose jig 7.

Upon start of the program shown in FIG. 1, first in Steps S21, similarly as in the conventional method, by using the special purpose jig 7, the detector circuit 10 and the automatic calculating means 111 in the processor 11 are operated to automatically calculate the distances $X_b$ and $Y_b$ of the upper and lower wire guides 2 and 3 from the reference table 5. In Step S22, it is determined whether or not a correction factor $\alpha$ has been obtained. When it is determined that the correction factor has been $\alpha$ obtained ("yes"), then Step S28 is effected; and when not ("no"), Step S23 is effected. In the Step S23, the workpiece is machined just for test according to the distances $X_b$ and $Y_b$ calculated in Step S21 and a set angle $\theta_a$.

In Step S24, the actual taper angle $\theta_d$ is measured with a measuring instrument. The angle difference $\Theta_e$ between the actual taper angle $\theta_d$ and the set angle $\theta_a$ is stored in the memory 12. Thereafter in Step S25, the input/display unit 13 is operated to input data such as the distances $X_b$ and $Y_b$ of the upper and lower wire guides 2 and 3 determined through the test machining operation, the Z-axis reference height z and the set angle $\theta_a$ in the test machining operation, the angle difference $\theta_e$ of the workpiece machined for test, and other data $\Delta X_b$ and $(X_b - z)$. Those data are inputted in parameter input items necessary for calculation of the correction factor for instance in a parameter input item 14 on the screen of the input/display unit 13 as shown in FIG. 7.

Then, in Step S26, the correction factor $\alpha$ is calculated by the correction factor calculating means 112 of the processor 11 according to the following equations:

$$D_b = X_b + Y_b \qquad (6)$$

$$l_b = D_b \tan \theta_a \qquad (7)$$

$$D_c = l_b/(\tan (\theta_a + \theta_e)) \qquad (8)$$

$$\Delta X_b + Y_b = D_b - z \qquad (9)$$

$$\Delta X_c + Y_c = D_c - z$$

$$\alpha = (\Delta X_c + Y_c)/(\Delta X_b + Y_b) \qquad (10)$$

where $D_b$ is the calculated distance between the calculated positions 2d and 3d of the upper and lower wire guides 2 and 3, and Dc is the distance between the actual positions of the upper and lower wire guides 2 and 3 corresponding to the measured angle $\theta_d$, $\Delta X_b = (X_b - z)$, and $\Delta X_c = (X_c - z)$ The correction factor $\alpha$ is stored in the memory 12 in Step S27. In Step S28, the automatic correcting means 112 of the processor 11 is operated to multiply the distances $X_b$ and $Y_b$ of the upper and lower wire guides 2 and 3 from the surface table 5 by the correction factor $\alpha$ to obtain the corrected distances $X_c$ and $Y_c$ thereof; that is, the automatic correcting means 112 operates according to the following equations (11):

$$\Delta X_c = \alpha \cdot \Delta X_b \qquad (11)$$

$$Y_c = \alpha \cdot Y_b$$

$$X_c = z + \Delta X_c$$

The data $X_c$ and $Y_c$ thus obtained by the expression (11) are stored in the memory 12 in Step 29. The results of calculation are displayed on the input/display unit 13 as indicated at 15 in FIG. 7.

Figure 9:
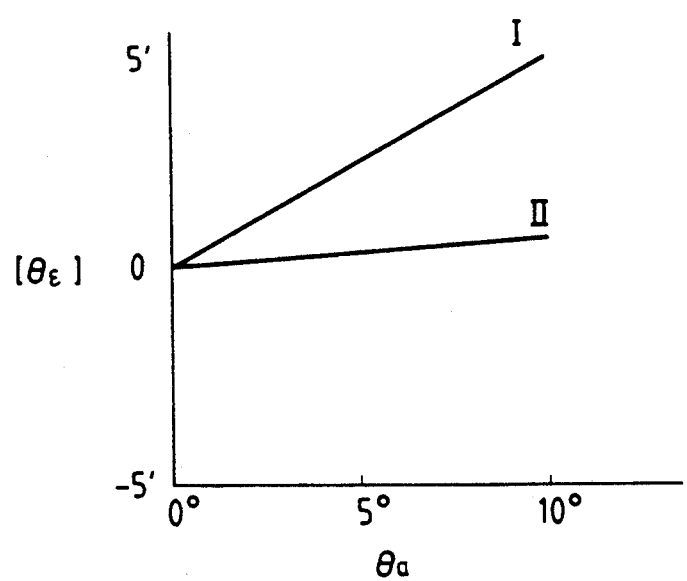
FIG. 9 is a graphical representation indicating taper angle with angle error.

That is, in the invention, the correction factor $\alpha$ calculated through the machining of the test workpiece is used to automatically correct the distances $X_b$ and $Y_b$ of the upper and lower wire guides 23 from the reference table 5 which have been calculated with the special purpose jig 7, thereby to obtain the actual distances $X_c'$ and $Y_c'$ of the upper and lower wire guides 2 and 3 from the surface table 5. Hence, the data thus obtained are correct. As a result, in the invention the angle error $\theta_e$ with respect to the taper angle $\theta_d$ is considerably small as indicated by a curve II in FIG. 9, while, in the conventional method, it is large is indicated by a curve I. Thus, according to the invention, the taper machining accuracy can be increased independently of the manufacturing error of the special purpose jig 7.

As was described above, in the invention, the correction factor calculated through the machining of a test workpiece is used to correct the upper and lower wire guides from the surface table are, which have calculated as the data necessary for controlling the movement of the wire guides to stretch the wire electrode under tension. Hence, the taper machining accuracy with the wire electrode can be improved independently of the manufacturing error of the special purpose jig.

What is claimed is:

1. A wire cut electric discharge machine in which upper and lower wire guides stretching a wire electrode under tension are moved horizontally to taper a workpiece, comprising:

automatic calculating means for calculating the distance of said upper and lower wire guides from a surface table which are necessary for moving said wire guides to incline said wire electrode with a predetermined taper-angle;

correction factor calculating means for calculating a correction factor $\alpha$ for the distances of said upper and lower wire guides from said surface table according to a difference in an angle between the predetermined taper-angle and an actual taper angle of said workpiece which has been machined for test with said predetermined angle; and automatic correcting means for correcting the distance of said upper and lower wire guides from said surface table with reference to the distances by said correction factor thus calculated.

2. The wire cut electric discharge machine as claimed in claim 1 wherein the correction factor is defined by a ratio of the distance of said upper and lower wire guides corresponding to the actual taper angle and the distance thereof corresponding to the predetermined taper angle.

3. The wire cut electric discharge machine as claimed in claim 2 wherein said automatic correcting means corrects the actual distance corresponding to the actual taper angle by the correction factor.

4. A method for correcting a taper angle of a wire electrode of a wire cut electric discharge machine in which upper and lower wire guides are moved horizontally under applying tension to said electrode, comprising the steps of:

setting a taper angle of said wire electrode;

calculating a distance between said upper and lower wire guides, which corresponds to the taper angle thus set;

machining a test workpiece with the taper angle and the distance calculated for test-machining;

detecting an error in the taper angle, which occurs during the test-machining;

obtaining a correction factor based on the calculated distance between the upper and lower wire guides and an actual distance thereof in the test-machining; and correcting the positions of the upper and lower wire guides according to the correction factor.

* * * * *